(12) United States Patent
Whitsett

(10) Patent No.: US 8,833,304 B2
(45) Date of Patent: Sep. 16, 2014

(54) SMART FEEDER APPARATUS

(71) Applicant: Edward Whitsett, Mobile, AL (US)

(72) Inventor: Edward Whitsett, Mobile, AL (US)

(*) Notice: Subject to any disclaimer, the term of this patent is extended or adjusted under 35 U.S.C. 154(b) by 0 days.

(21) Appl. No.: 13/742,463

(22) Filed: Jan. 16, 2013

(65) Prior Publication Data

US 2013/0180456 A1    Jul. 18, 2013

Related U.S. Application Data

(60) Provisional application No. 61/587,330, filed on Jan. 17, 2012.

(51) Int. Cl.
   *A01K 5/02* (2006.01)
(52) U.S. Cl.
   USPC ........................................................ 119/57.92
(58) Field of Classification Search
   USPC .................. 119/57.92, 51.02, 57.91
   See application file for complete search history.

(56) References Cited

U.S. PATENT DOCUMENTS

| | | | |
|---|---|---|---|
| 5,299,529 A | 4/1994 | Ramirez | |
| 5,370,080 A | 12/1994 | Koepp | |
| 5,549,075 A * | 8/1996 | Golden | 119/57.92 |
| 5,749,316 A * | 5/1998 | Deagan | 119/57.8 |
| 5,782,201 A * | 7/1998 | Wells | 119/57.4 |
| 6,062,166 A * | 5/2000 | Macrina | 119/51.11 |
| 6,067,933 A * | 5/2000 | Cason | 119/52.1 |
| 6,698,381 B2 * | 3/2004 | Lynch | 119/61.5 |
| 6,779,486 B2 * | 8/2004 | Vaags | 119/51.11 |
| 6,845,735 B1 * | 1/2005 | Northrop et al. | 119/52.1 |
| 7,159,539 B2 * | 1/2007 | Neckel | 119/51.02 |
| 7,380,518 B2 * | 6/2008 | Kates | 119/72 |
| 7,513,216 B2 * | 4/2009 | Neckel | 119/51.02 |
| 7,617,799 B2 * | 11/2009 | Kates | 119/712 |
| 7,789,041 B1 | 9/2010 | Taylor | |
| 2011/0088625 A1 * | 4/2011 | Nowacek | 119/51.02 |

\* cited by examiner

*Primary Examiner* — Yvonne Abbott
(74) *Attorney, Agent, or Firm* — Buckingham, Doolittle & Burroughs, LLC

(57) ABSTRACT

An animal feeder apparatus for remotely monitoring a level of feed is provided. The animal feeder apparatus comprises a feed dispenser component, a sensing component, and a transmitter. The animal feeder apparatus allows a user to receive an electronic message when the level of feed changes or when the position of the animal feeder apparatus is disturbed, and a method of using the same.

15 Claims, 5 Drawing Sheets

SMART FEEDER APPARATUS

CROSS-REFERENCE

This application claims priority from Provisional Patent Application Ser. No. 61/587,330 filed Jan. 17, 2012.

FIELD OF THE INVENTION

This invention pertains generally to an apparatus for feeding animals, and more particularly to an animal feeder apparatus that can be remotely monitored to verify a level of feed and presence of the animal feeder apparatus in a desired location and a method of using the same.

BACKGROUND

Animal feeders are used by hunters to lure wild animals such as turkeys and deer to certain areas prior to and during hunting seasons. However, maintaining these feeders can be labor intensive and time consuming. The feeder can run out of feed without warning before a user has the opportunity to inspect the feed level. Additionally, the feeder may be tipped over by animals or be removed by thieves. If the feeder is runs out of feed or is otherwise disabled, the turkeys or deer will likely move out of the area to find another source of food. As a result, a hunter will no longer enjoy the advantage of a known area populated by prey once the hunting season begins.

Consequently, there is a need for an animal feeder that allows a user to monitor the status of a turkey or deer feeder remotely without the need to travel to a hunting site to visually inspect the feeder. The proposed invention allows a user to remotely monitor a level of feed in an animal feeder apparatus. This eliminated the need for continual visual inspection of the animal feeder which may be placed in an out-of-the-way location such as in the woods. Additionally, the user may also remotely monitor whether the animal feeder apparatus has been knocked over or removed from the desired location.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an animal feeder apparatus for remotely monitoring a level of feed. The animal feeder apparatus comprises a feed dispenser component, a sensing component, and a transmitter. The sensing component comprises a plurality of sensors at different levels within the feed dispenser component that determine when the level of feed drops below certain levels triggering the transmitter to send a wireless electronic communication to a user.

Furthermore, in a preferred embodiment, the sensing component further comprises an impact sensor element to determine whether the animal feeder apparatus is no longer in an upright position or if it has been moved from its location. The transmitter is in communication with both the plurality of sensors and the impact sensor element. Once any part of the sensing component is triggered, the transmitter then alerts the user. Furthermore, the transmitter may be located remote to the feed dispenser component, such as in a nearby tree, to improve the ability to send the wireless communication to the user.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
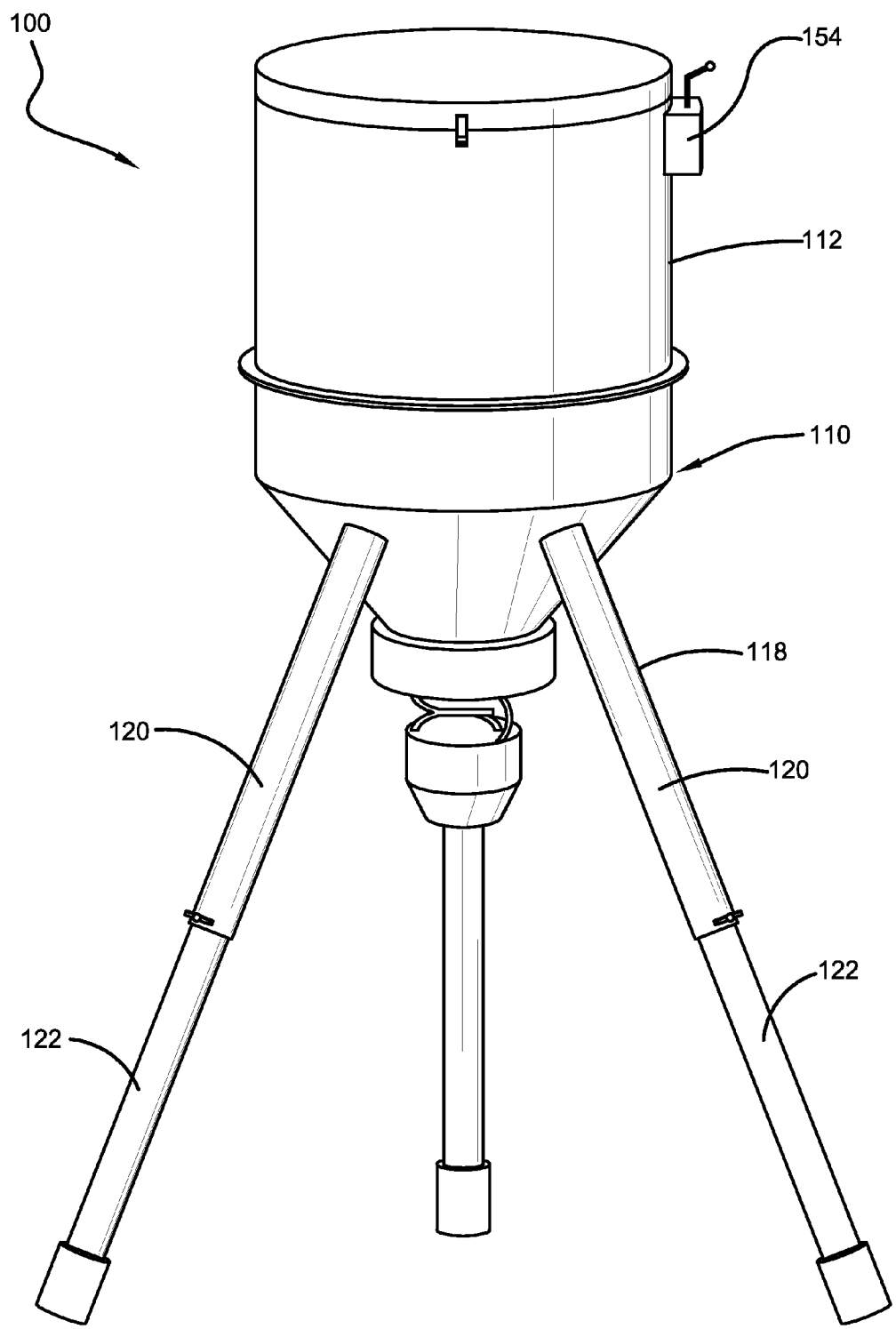
FIG. 1 illustrates a perspective view of an animal feeder apparatus in accordance with the disclosed architecture.
Figure 2:
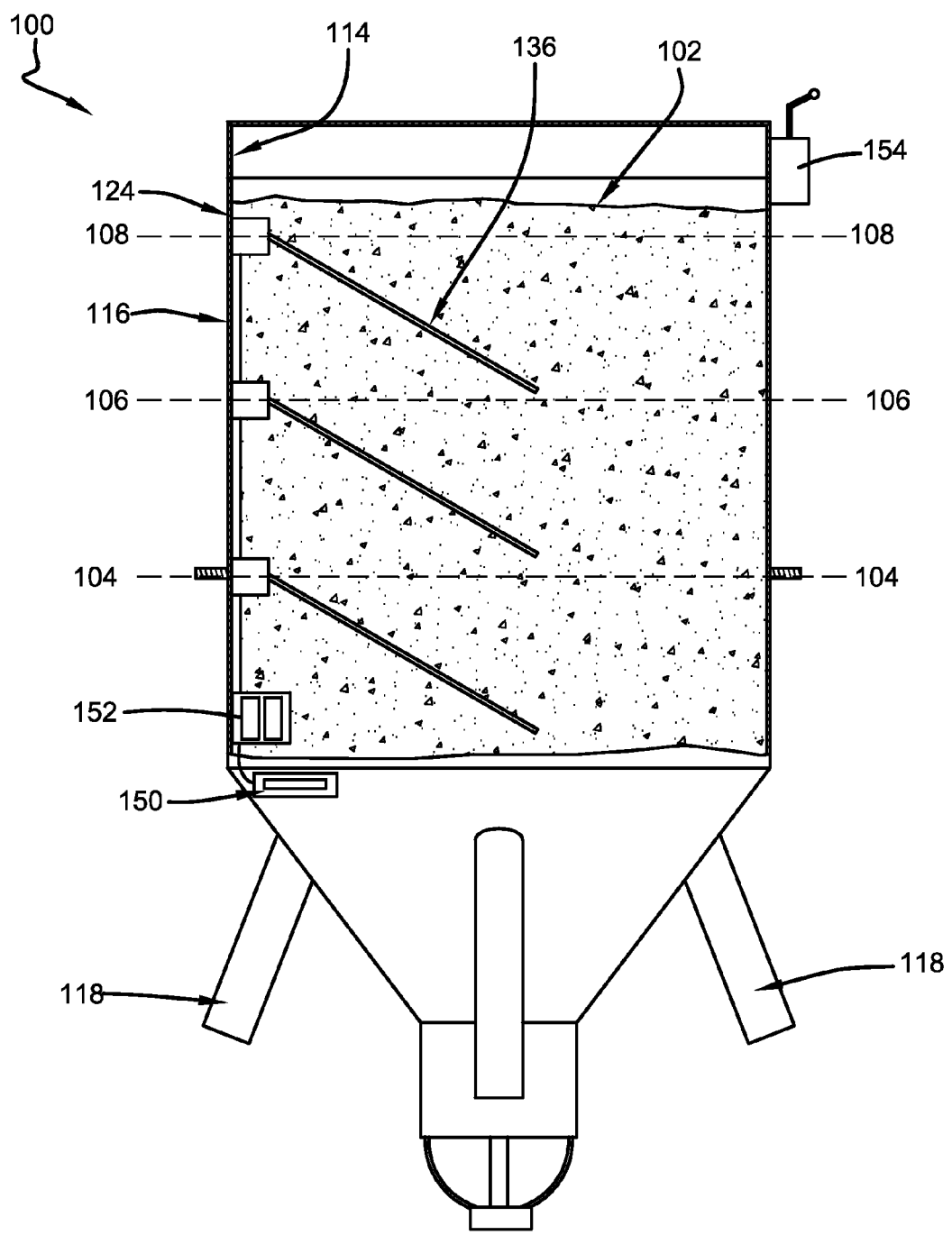
FIG. 2 illustrates a perspective view of the animal feeder apparatus full of feed in accordance with the disclosed architecture.
Figure 3:
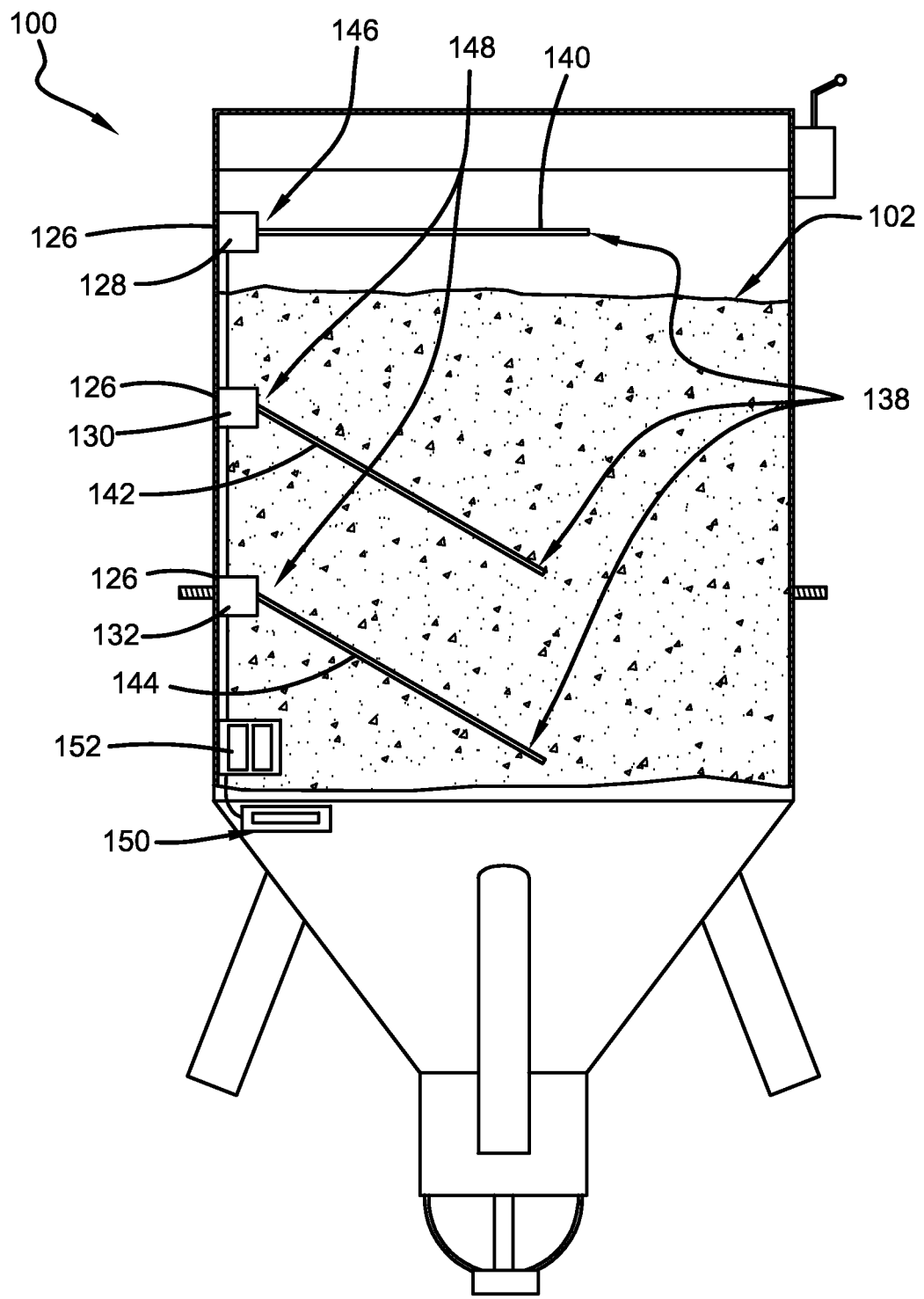
FIG. 3 illustrates a perspective view of the animal feeder apparatus as a level of feed drops below ¾ full in accordance with the disclosed architecture.
Figure 4:
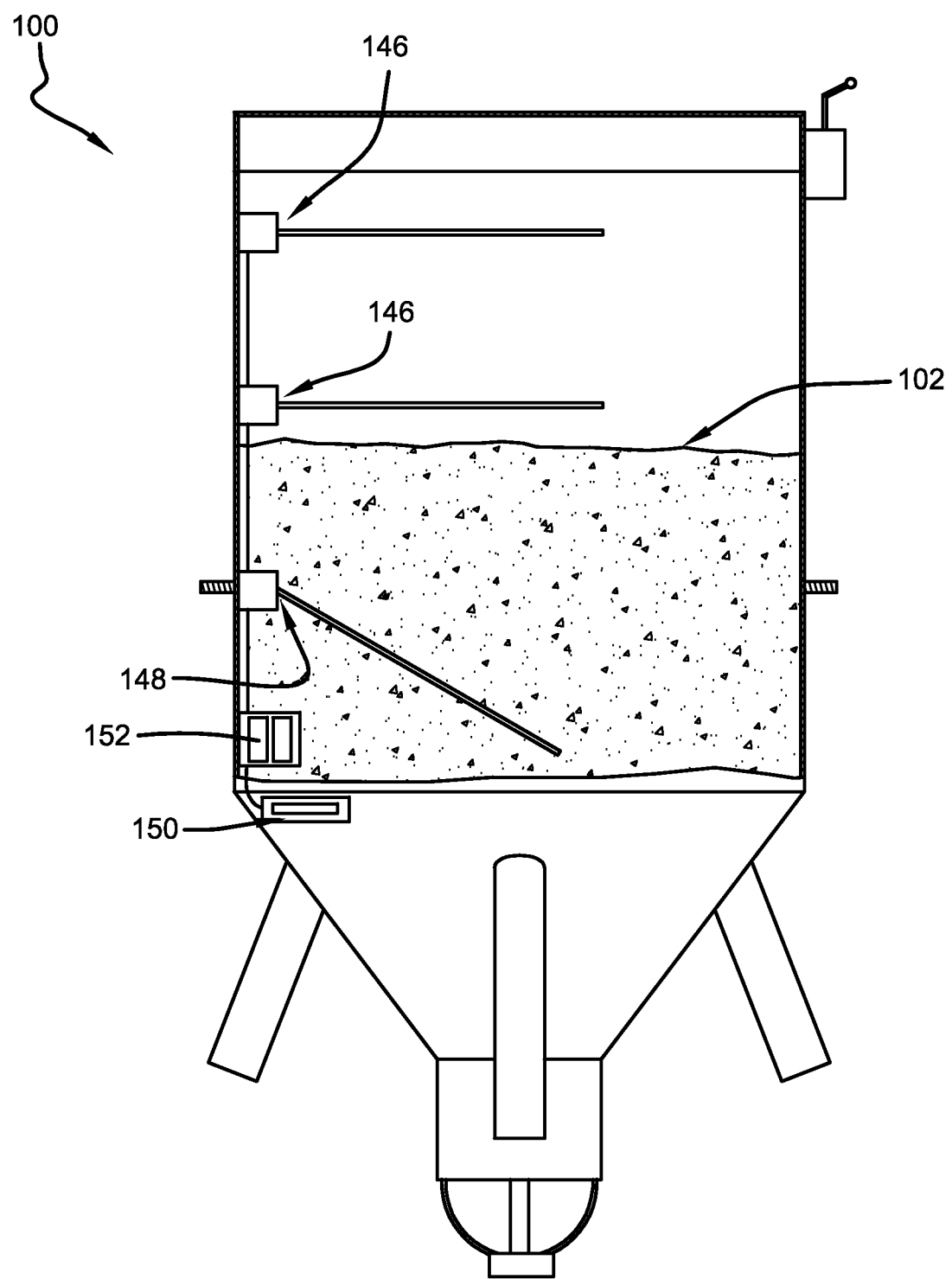
FIG. 4 illustrates a perspective view of the animal feeder apparatus as the level of feed drops below ½ full in accordance with the disclosed architecture.
Figure 5:
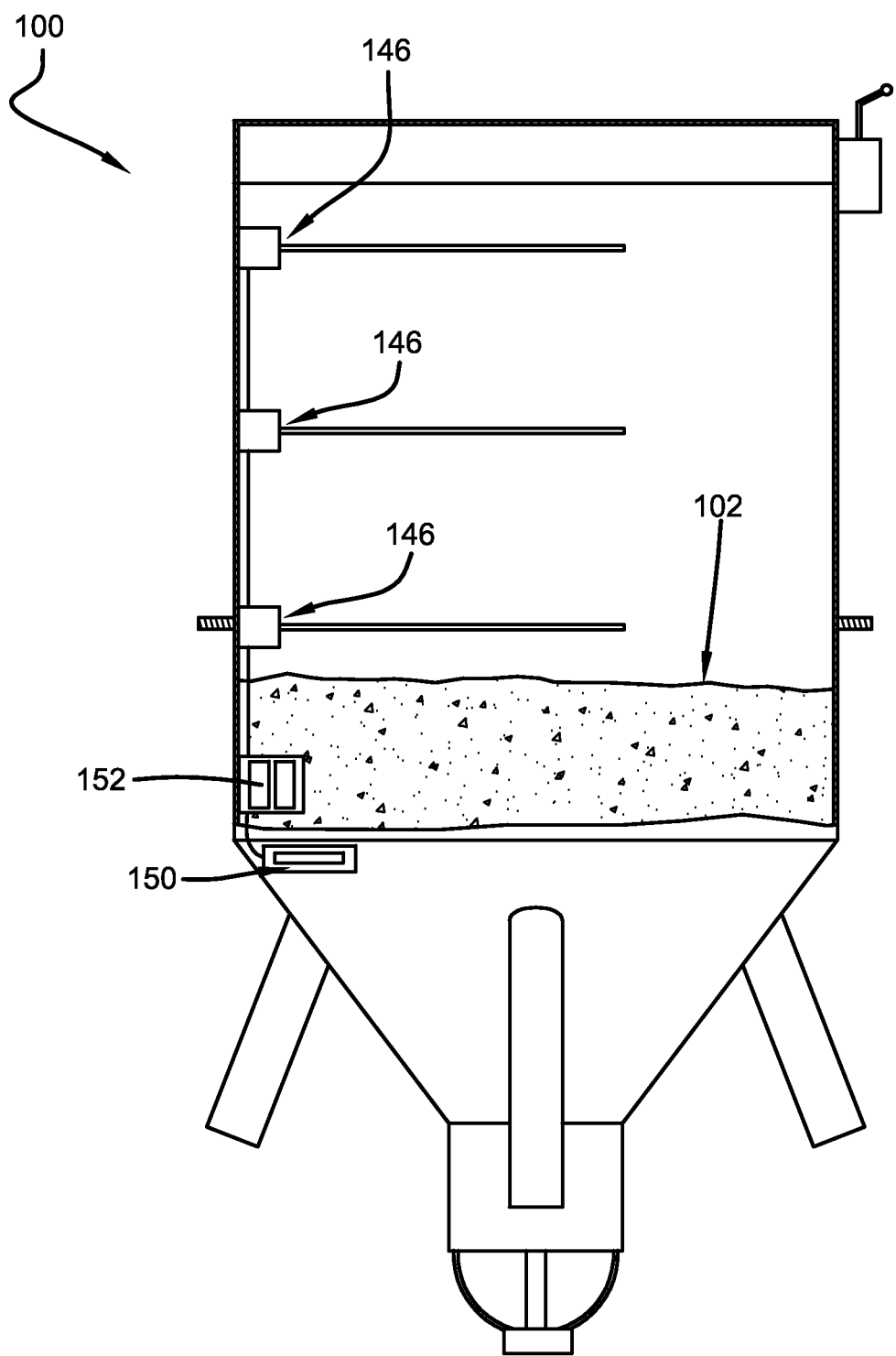
FIG. 5 illustrates a perspective view of the animal feeder apparatus as the level of feed drops below ¼ in accordance with the disclosed architecture.

Referring initially to the drawings, FIGS. 1 and 2 illustrate an animal feeder apparatus 100 for notifying a user if there is a change in a level of feed 102 or the position of the animal feeder apparatus 100. The animal feeder apparatus 100 allows a user to remotely monitor a status of the level of feed 102 or if the position of the animal feeder apparatus 100 has been disturbed. The animal feeder apparatus 100 is usable by hunters, naturalists, wild game photographers, and the like.

The animal feeder apparatus 100 comprises a feed dispenser component 110 and a sensing component 124. The feed dispenser component 110 comprises a feed container 112 and a base 118. The feed container 112 is typically a substantially hollow reservoir comprising an interior 114 and an exterior 116 manufactured from metal, plastic, and the like. Animal feed such as corn, grain, seed and the like or any other food as is known by one of skill in the art, may be held within and dispensed by the feed container 112.

The base 118 typically comprises a plurality of legs 120 that are extendable with a plurality of leg extensions 122. In a preferred embodiment the plurality of legs 120 form a tripod for positioning the feed container 112 above the ground. However, the plurality of legs 120 may comprise more than three depending on the need for additional stability as desired. The plurality of leg extensions 122 may be used to increase or decrease the height of the feed container 112 above the ground depending on the feeding requirements of a desired prey.

As illustrated in FIGS. 2-5, the sensing component 124 comprises a plurality of switch elements 126 locatable within the feed container 112. In a preferred embodiment, the plurality of switch elements 126 are micro-switches comprising a first switch 128, a second switch 130, and a third switch 132. However, the plurality of switch elements 126 may comprise any number of switches as desired. The first, second, and third switches 128, 130, and 132 are attachable to the interior 114 of the feed container 112 at a plurality of intervals. Preferably, the plurality if intervals correspond to the level of feed 102 with the first switch 128 indicating ¾ full 104, the second switch 130 indicating ½ full 106, and the third switch 132 indicating ¼ full 106, although the plurality of intervals could be at any level of feed desired to be indicated by the user. Typically, while the plurality of switch elements 126 is attachable to the feed container 112 with mechanical fasteners such as screws, rivets, and the like, they may be attached permanently as well.

The plurality of switch elements 126 each may further comprise a pressure sensitive element 136 which is typically hinged rods 138. Therefore, in the preferred embodiment the pressure sensitive element 136 comprises a first rod 140, a second rod 142 and a third rod 144 each integrally connected to the corresponding switch 128, 130, and 132. The hinged rods 132 are pressure sensitive and independently movabable between an open position 148 and a closed position 148 as the level of feed 102 in the feed container 112 changes. In the closed position 148, the hinged rods 138 extend outward so that they are substantially perpendicular to the interior 114 of the feed dispenser 112. In the open position 146, the hinged rods 138 angle downwards. As one of the hinged rods 138 moves from the open position 146 to the closed position 148, the corresponding micro-switch is activated.

Alternatively, although not shown, the plurality of switch elements 126 may employ a laser where a beam of light is blocked by the feed until the level of feed 102 drops below the level of the beam of light. Once unobstructed, the beam of light would contact a reflector located on the interior 114 of the feed container 112 opposite of the laser activating the corresponding micro-switch. Similarly, another embodiment may employ a spring loaded cylinder (not shown) insertable within the feed container 112. A spring would be compressed under the weight of the feed and relax as feed is dispensed raising the level of the spring loaded cylinder thereby tripping the plurality of switch elements 126.

The sensing component 124 further comprises an impact sensor element 150 attached to the interior 114 or the exterior 116 of the feed container 112. The impact sensor element 150 senses movement or motion of the animal feeder apparatus 100. If the animal feeder apparatus 100 is moved by an unauthorized person, or is knocked over, the impact sensor element 150 is activated. The impact sensor may comprise a tilt switch such as a mercury relay tilt switch. Each of the plurality of switch elements 126 and the impact sensor element 150 are electrically connected to a power source 152 such as a battery pack mountable to the animal feeder apparatus 100.

The animal feeder apparatus 100 further comprises a transmitter 154 in electronic communication with the sensing component 124. The transmitter 154 is attachable to the animal feeder apparatus 100 or may be unattached for locating the transmitter 154 at a higher elevation to increase signal strength, such as in a nearby tree. The transmitter 154 is activated wirelessly if any of the plurality of switch elements 126 or the impact sensor element 150 is activated. Once activated, the transmitter 154 notifies the user via email, text, or the like that one of the sensing components 124 has been activated. For example, when one of the hinged rods 138 moves from the open position 146 to the closed position 148, an email is sent notifying the user that the level of feed 102 in the feed container 110 has changed. Similarly, if the animal feeder apparatus 100 is knocked over by an animal, the impact sensor element 150 triggers the transmitter 154 to send a message that the animal feeder apparatus 100 has been knocked over. While typically pre-assembled, the animal feeder apparatus 100 may be created by retrofitting an existing prior art animal feeder with the components described supra.

The invention further comprises an exemplary method for using the animal feeder apparatus 100 to remotely monitor the level of feed 102 and/or a change in position. The method will be described with respect to FIGS. 2-5. The user would place the animal feeder apparatus 100 in a desired location. The first switch element 128 is located within the feed container at the ¾ full level 108, the second switch element 130 at the ½ full level 106, and the third switch element 132 at the ¼ full level 104. Next, feed is poured into the feed container 112 with the weight of the feed forcing the third rod 144, the second rod 142, and the first rod 140 downward so that they are in the open position 146.

As feed is dispensed and the level of feed 102 drops below ¾ full 108, the first rod 140 moves or springs upward so that the first switch 128 moves to the closed position 148. At this point, the first switch 128 triggers the transmitter 154 wirelessly to send an electronic mail to the user that the level of feed 102 has dropped below ¾ full 108. As the level of feed 102 drops below ½ full 106, the second rod 142 springs upward so that the second switch 130 moves to the closed position 148 triggering the transmitter 154 to notify the user that the level of feed 102 has dropped below ½ full 106. As the level of feed 102 drops below ¼ full 104, the third rod 144 springs upward so that the third switch 132 moves to the closed position 148 triggering the transmitter 154 to notify the user that the level of feed 102 has dropped below ¼ full 104. Additionally, any time that the animal feeder apparatus 100 tips over or is moved without authorization by the user, the impact sensor element 150 senses the change in position triggering the transmitter 154 to notify the user of the movement.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An animal feeder apparatus comprising:
    a feed dispenser component comprising a feed container for holding feed and a base;
    a sensing component attached to the feed container comprising three switches housed within the feed container at a ¼ full level, a ½ full level, and a ¾ full level and an impact sensor element, wherein the three switches each comprise a pressure sensitive hinged rod; and
    a transmitter in electronic communication with the sensing component for transmitting a wireless electronic message.

2. The animal feeder apparatus of claim 1, wherein the three switches are micro-switches.

3. The animal feeder apparatus of claim 1, wherein the hinged rods are each movable between an open position and a closed position.

4. An animal feeder apparatus for remotely monitoring a level of feed, the animal feeder apparatus comprising:
    a feed dispenser component comprising a feed container for holding feed and a base;
    a sensing component attached to the feed container comprising three switches housed within the feed container and an impact sensor element, wherein the three switches each comprise a micro-switch connected to a pressure sensitive movable hinged rod; and
    a transmitter in electronic communication with the sensing component for transmitting a wireless electronic message.

5. The animal feeder apparatus of claim 4, wherein the three switches are located within the feed container at a plurality of intervals.

6. The animal feeder apparatus of claim 5, wherein the plurality of levels comprise the following intervals: ¼ full, ½ full, and ¾ full.

7. The animal feeder apparatus of claim 6, further comprising a power source for powering the sensing component.

8. The animal feeder apparatus of claim 6, wherein the hinged rods are independently movable between an open position and a closed position depending on the level of feed in the feed container.

9. The animal feeder apparatus of claim 8, wherein the transmitter sends an electronic message any time one of the hinged rods moves from the open position to the closed position or when movement of the animal feeder apparatus triggers the impact sensor element.

10. The animal feeder apparatus of claim 4, wherein the transmitter is in wireless communication with the sensing component.

11. The animal feeder apparatus of claim 4, wherein the transmitter is locatable a distance away from the animal feeder apparatus.

12. A method of remotely monitoring a level of feed in an animal feeder comprising the steps of:
    a. providing an animal feeder apparatus;
    b. positioning a first pressure sensitive hinged rod switch at a ¾ full level;
    c. positioning a second pressure sensitive hinged rod switch at a ½ full level;
    d. positioning a third pressure sensitive hinged rod switch at a ¼ full level;
    e. filling the animal feeder apparatus with feed so that the pressure sensitive hinged rod switches are in an open position;
    f. receiving an electronic message from a transmitter when the first pressure sensitive hinged rod switch moves from the open position to the closed position indicating that the level of feed has dropped below ¾ full.

13. The method of claim 12, receiving an electronic message from a transmitter when the second pressure sensitive hinged rod switch moves from the open position to the closed position indicating that the level of feed has dropped below ½ full.

14. The method of claim 13, receiving an electronic message from a transmitter when the third pressure sensitive hinged rod switch moves from the open position to the closed position indicating that the level of feed has dropped below ¼ full.

15. The method of claim 14, receiving an electronic message from a transmitter when an impact sensing element senses movement of the animal feeder apparatus.

* * * * *